(12) United States Patent
Eom et al.

(10) Patent No.: US 11,556,166 B2
(45) Date of Patent: Jan. 17, 2023

(54) METHOD FOR CONTROLLING ENERGY SAVING, AND APPARATUS THEREFOR

(71) Applicant: Samsung Electronics Co., Ltd., Gyeonggi-do (KR)

(72) Inventors: Seungyeon Eom, Gyeonggi-do (KR); Dooman Lee, Gyeonggi-do (KR); Byungsoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/296,661

(22) PCT Filed: Dec. 3, 2019

(86) PCT No.: PCT/KR2019/016951
§ 371 (c)(1),
(2) Date: May 25, 2021

(87) PCT Pub. No.: WO2020/116908
PCT Pub. Date: Jun. 11, 2020

(65) Prior Publication Data
US 2022/0026973 A1    Jan. 27, 2022

(30) Foreign Application Priority Data

Dec. 6, 2018  (KR) ........................ 10-2018-0155749

(51) Int. Cl.
*G06F 1/329*   (2019.01)
*G06Q 50/06*   (2012.01)
(52) U.S. Cl.
CPC ............. *G06F 1/329* (2013.01); *G06Q 50/06* (2013.01)

(58) Field of Classification Search
CPC . Y02B 70/3225; Y04S 20/222; Y04S 20/242; Y04S 20/30
See application file for complete search history.

(56) References Cited

U.S. PATENT DOCUMENTS

| 7,715,951 | B2 | 5/2010 | Forbes, Jr. et al. |
| 8,010,812 | B2 | 8/2011 | Forbes, Jr. et al. |
| 8,903,564 | B2 | 12/2014 | Lee et al. |

(Continued)

FOREIGN PATENT DOCUMENTS

| JP | 2011-106698 A | 6/2011 |
| JP | 2016-212489 A | 12/2016 |

(Continued)

*Primary Examiner* — Ji H Bae
*Assistant Examiner* — Cheri L Harrington
(74) *Attorney, Agent, or Firm* — Cha & Reiter, LLC

(57) ABSTRACT

An electronic device is provided. The electronic device includes an operation of determining at least one control level by executing at least one scheduling process, an operation of selecting one control level from among the at least one control level, and an operation of transmitting a power control signal corresponding to the selected control level to one or more control target devices. The operation of determining the control level may include an operation of performing a first scheduling process of receiving first power usage data from an external power amount data providing device and determining a first control level based on the first power usage data. In addition to this, various embodiments identified through the specification are possible.

12 Claims, 13 Drawing Sheets

(56) References Cited

U.S. PATENT DOCUMENTS

| | | | |
|---|---|---|---|
| 2005/0207081 A1* | 9/2005 | Ying | H02J 13/00034 |
| | | | 361/105 |
| 2009/0062970 A1 | 3/2009 | Forbes, Jr. et al. | |
| 2010/0161148 A1 | 6/2010 | Forbes, Jr. et al. | |
| 2012/0209443 A1* | 8/2012 | Lee | H02J 3/14 |
| | | | 700/295 |
| 2016/0349725 A1* | 12/2016 | Miura | G05B 19/042 |
| 2018/0276768 A1* | 9/2018 | Mori | G06F 1/3234 |
| 2018/0294647 A1* | 10/2018 | Borean | H02J 3/14 |
| 2018/0361868 A1* | 12/2018 | Ellgas | G05B 19/042 |
| 2019/0155227 A1* | 5/2019 | Song | G05B 13/0265 |
| 2020/0184577 A1* | 6/2020 | Nakagaki | G06Q 50/06 |

FOREIGN PATENT DOCUMENTS

| | | |
|---|---|---|
| KR | 10-2009-0053167 A | 5/2009 |
| KR | 10-2010-0049122 A | 5/2010 |
| KR | 10-2011-0035393 A | 4/2011 |
| KR | 10-2012-0091909 A | 8/2012 |
| KR | 10-2014-0114665 A | 9/2014 |
| KR | 10-2017-0089549 A | 8/2017 |

* cited by examiner

METHOD FOR CONTROLLING ENERGY SAVING, AND APPARATUS THEREFOR

CROSS REFERENCE TO RELATED APPLICATIONS

This application is a National Phase Entry of PCT International Application No. PCT/KR2019/016951, which was filed on Dec. 3, 2019, and claims a priority to Korean Patent Application No. 10-2018-0155749, which was filed on Dec. 6, 2018, the contents of which are incorporated herein by reference.

TECHNICAL FIELD

Embodiments disclosed in this document relate to a technology for controlling energy usage of a control target device through a communication connection.

BACKGROUND ART

A demand response (DR) means changing the energy usage to meet the demand for an amount of energy that can be supplied. In particular, in the case of electric energy, since there is a problem that it is difficult to store, power suppliers were able to meet the maximum demand only by having their production capacity matched to the maximum demand, or supplying power from other sources of supply. However, with this supply method, there is a limit to increasing an amount of energy supply, and a situation may occur where the operation cost is high or the demand exceeds the maximum production amount of the supplier.

That is, there is a limit for the supplier to meet the demand. To the contrary, some users may postpone a task requiring a large amount of energy, or stop some functions of a device to reduce the amount of energy used to adjust the demand. A payer who provides incentives related to an energy provider who supplies energy or a supplier (hereinafter, the 'supplier' may include one or more of the energy supplier or incentive payer) may provide incentives to users who have reduced their energy usage to satisfy conditions presented in order to induce demand adjustment.

In order to determine whether or not the supplier will provide incentives to users, a method for checking whether or not the users have saved energy usage according to the presented conditions is required. The supplier may install, in order to determine whether or not the user saves energy, a device (for example, a watt hour meter) that can remotely check the energy usage on the user's device to determine the user's energy usage through the device.

However, due to the cost of installing a device capable of measuring the energy usage, participation in the demand response market was mainly made only for large-scale power users such as factories, hospitals, or large buildings.

In addition, when reduction in energy usage is required, if the supplier requests, through a telephone or the like, to the user to save energy, the user voluntarily adjusts the energy usage. However, in the above method, it is difficult to obtain an effect of energy saving because a large number of small-scale energy users are requested to individually adjust the energy usage. In addition, according to the above method, there is a problem in that it is difficult for the user to save an appropriate amount of energy. In addition, according to the above method, there is an inconvenience in that a large number of small-sized users have to directly adjust energy usage.

DISCLOSURE OF THE INVENTION

Technical Problem

A technical problem to be solved by an embodiment is to provide a method and apparatus for allowing users participating in a demand response market to control energy usage in response to energy saving requests without directly adjusting energy usage.

Another technical problem to be solved by another embodiment is to provide a method and apparatus for providing reliable energy saving information that the supplier can trust even for devices without having a separate energy usage meter reading device installed.

Another technical problem to be solved by another embodiment is to provide a method and apparatus for allowing appropriate incentives to be distributed to users participating in the demand response market.

Technical Solution

According to an aspect of the present disclosure, there is provided an electronic device including a communication circuit configured to receive data related to one or more control target devices from the one or more control target devices or transmit a control signal to the one or more control target devices, at least or more processors configured to perform communication by being connected to the communication circuit, and a memory electrically connected to the processor and configured to store a program executed by the processor. The processor, when the program is executed, may be configured to execute at least one scheduling process to determine at least one control level, and the processor may be configured to transmit a power control signal corresponding to a control level selected from among the determined at least one control level to the one or more control target devices through the communication circuit. The at least one scheduling processes may include a first scheduling process of receiving first power usage data from an external power amount data providing device through the communication circuit and determining a first control level based on the received first power usage data.

According to an aspect of the present disclosure, there is provided a method including an operation of determining at least one control level by executing at least one scheduling process, an operation of selecting one control level from among the at least one control level, and an operation of transmitting a power control signal corresponding to the selected control level to one or more control target devices. The operation of determining the control level may include an operation of performing a first scheduling process of receiving first power usage data from an external power amount data providing device and determining a first control level based on the first power usage data.

In accordance with another aspect of the present disclosure, a storage medium is provided. The storage medium includes a program that, when executed, causes an electronic device to execute at least one scheduling process to execute an operation of determining at least one control level, an operation of selecting one control level from among the at least one control level, and an operation of transmitting a power control signal corresponding to the selected control level to one or more control target devices. The operation of determining the control level may include an operation of performing a first scheduling process of receiving first power usage data from an external power amount data providing device and determining a first control level based on the first power usage data.

Advantageous Effects

According to the embodiments disclosed in this document, energy usage can be efficiently reduced according to the conditions presented by the supplier without being required for the energy user to be aware of the energy saving request.

In addition, even for devices that do not have an energy usage meter reading device installed, reliable energy saving information can be provided to the supplier.

In addition, a criterion for appropriately distributing incentives to users participating in the demand response market can be presented.

In addition to this, various effects identified directly or indirectly through this document can be provided.

BRIEF DESCRIPTION OF THE DRAWINGS

With regard to the description of the drawings, the same or similar reference numerals may be used for the same or similar components.

MODE FOR CARRYING OUT THE INVENTION

Hereinafter, various embodiments of the present disclosure will be described with reference to the accompanying drawings. However, this is not intended to limit the present disclosure to a specific embodiment, it should be understood to include various modifications, equivalents, and/or alternatives of the embodiments of the present disclosure.

Figure 1:
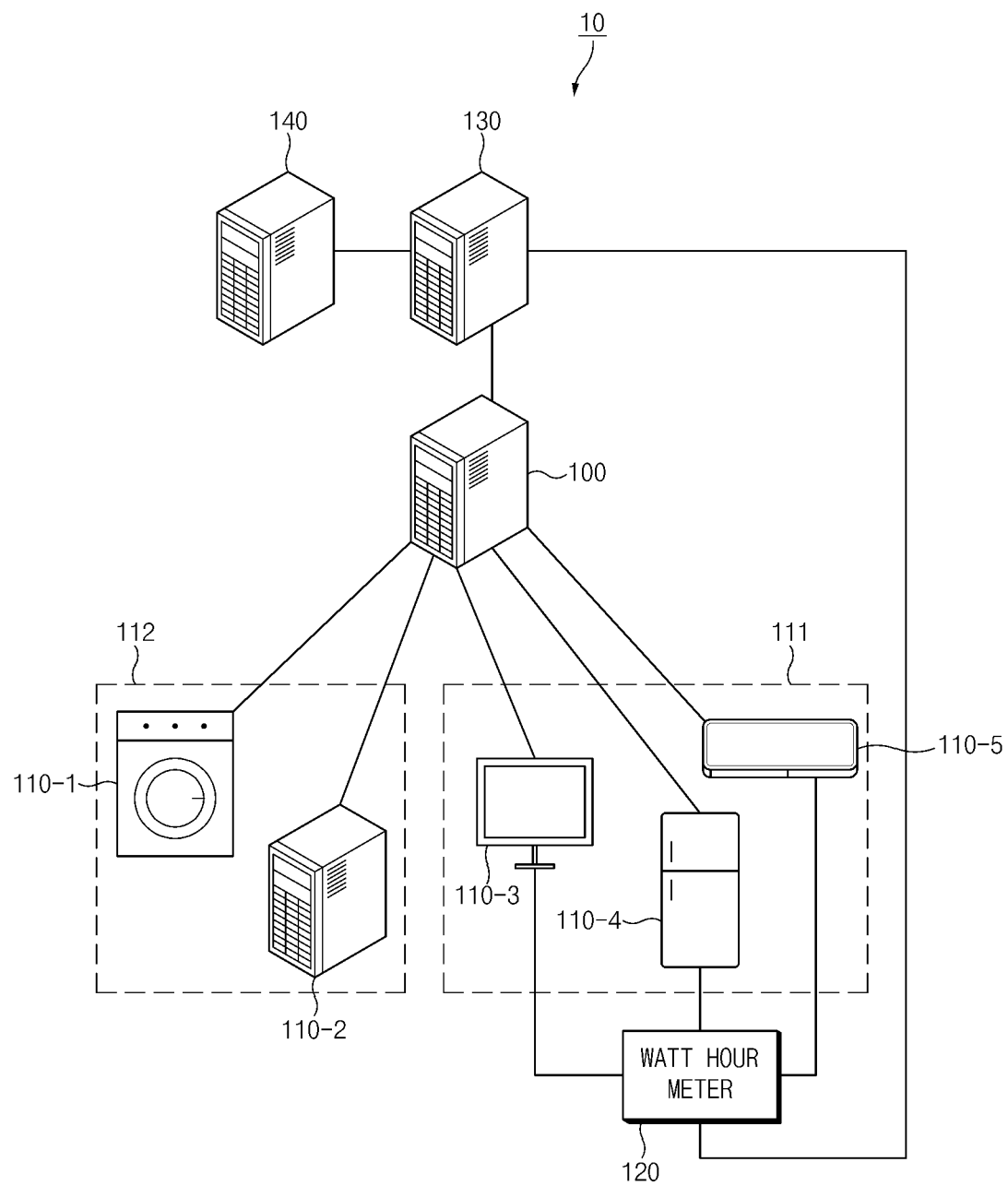
FIG. 1 is a conceptual diagram illustrating a configuration of a demand response control system according to an embodiment.

FIG. 1 is a conceptual diagram illustrating a configuration of a demand response control system 10 according to an embodiment of the present disclosure.

The demand response control system 10 according to an embodiment of the present disclosure may include an electronic device 100, control target devices 110-1, 110-2, 110-3, 110-4, and 110-5, and a watt hour meter 120, a power amount data providing device 130, and a power control requesting device 140.

The electronic device 100 may be a computing device connected to the control target devices 110-1, 110-2, 110-3, 110-4, and 110-5. For example, the electronic device 100 may be connected to the control target devices 110-1, 110-2, 110-3, 110-4, and 110-5 to configure the Internet of Things. For example, the electronic device 100 may be a cloud server connected to the control target devices 110-1, 110-2, 110-3, 110-4, and 110-5.

Accordingly, the electronic device 100 may receive data from the control target devices 110-1, 110-2, 110-3, 110-4, and 110-5, or transmit a control signal to the control target devices 110-1, 110-2, 110-3, 110-4, and 110-5. For example, the electronic device 100 may receive data, which is detected by the control target devices 110-1, 110-2, 110-3, 110-4, and 110-5, on the control target devices 110-1, 110-2, 110-3, 110-4, and 110-5. For example, data on the control target devices may be data obtained by sensing information related to the control target devices, such as information on an amount of power used by the control target device. The control signal may be, for example, a signal for changing a mode (e.g., setting an operation to control the amount of power consumed by the device, such as normal mode, power saving mode, power off, etc.) in which the controlled devices 110-1, 110-2, 110-3, 110-4, and 110-5 operate.

The control target devices 110-1, 110-2, 110-3, 110-4, and 110-5 may be devices whose operation is controlled according to the control signal received from the electronic device 100 by a user agreeing to demand response control. The control target devices 110-1, 110-2, 110-3, 110-4, and 110-5 may be devices that operate using power, such as an air conditioner, a refrigerator, a heating device, a lighting device, a display device, a washing machine, or a computing device.

Referring to FIG. 1, a watt hour meter 120 is installed for the control target devices 110-3, 110-4, and 110-5 belonging to a first group 111. In addition, the watt hour meter 120 is not installed for the control target devices 110-1 and 110-2 belonging to a second group 112. The watt hour meter 120 may detect the amount of power used by the control target devices for each of the control target devices 110-3, 110-4, and 110-5 belonging to the first group 111. The watt hour meter 120 may transmit power usage data including information on the detected power amount to the power amount data providing device 130.

A single watt hour meter 120 may detect the amount of power used by two or more devices of the control target devices 110-3, 110-4 and 110-5 belongs to the first group 111. That is, the watt hour meter 120 may detect the amount of power used by one or more of the control target devices 110-3, 110-4, and 110-5 by one device. The control target devices 110-3, 110-4, and 110-5 belonging to the first group 111 may be referred to as first control target devices.

The watt hour meter 120 may be a device installed or certified by a power supplies such as a power exchange or a power provider operating the power control requesting device 140. Accordingly, power usage data (or first power usage data) including information on the amount of power used by the control target devices 110-3, 110-4, and 110-5 acquired through the watt hour meter 120 may be used as data having objectivity. The watt hour meter 120 may provide information on the detected amount of power to the power amount data providing device 130.

Power usage data (or second power usage data) including information on the amount of power used by the control target devices 110-1 and 110-2 belonging to the second group 112 cannot be acquired through the watt hour meter 120. However, the power supplier who pays incentives to users participating in the demand response control only trusts information on the amount of power collected through the watt hour meter 120, and thus a method and apparatus for controlling the control target devices 110-1, 110-2, 110-3, 110-4, and 110-5 based on the amount of power collected through the watt hour meter 120 is required. In addition, a method and apparatus for evaluating a power saving amount value according to the amount of power used by the control target devices 110-1, 110-2, 110-3, 110-4, and 110-5 is required. In addition, the control target devices 110-1 and 110-2 belonging to the second group 112 may be referred to as second control target devices.

Accordingly, the electronic device 100 may receive power usage data including information on the amount of power acquired through the watt hour meter 120 from the power amount data providing device 130, and determine a degree of power control for all control target devices 110-1, 110-2, 110-3, 110-4, and 110-5 so that the power saving amount can be satisfied during a period in which all control target devices 110-1, 110-2, 110-3, 110-4, and 110-5 perform power control based on the received power usage data.

If the power control request is received from the power control requesting device 140, the power amount data providing device 130 may transfer the received power control request to the electronic device 100. While the electronic device 100 performs an operation (power control operation) of controlling the power used by the control target devices 110-1, 110-2, 110-3, 110-4, and 110-5 according to the power control request, the power amount data providing device 130 may collect information on the amount of power used through the power meter 120. In addition, after the power control operation of the electronic device 100 is completed, the power amount data providing device 130 may receive a report on the power saving performance result of the control target devices 110-1, 110-2, 110-3, 110-4, and 110-5 from the electronic device 100. The power amount data providing device 130 may verify the received power saving performance result and transmit the power saving performance result to the power control requesting device 140.

FIG. 1 is for illustrating an embodiment of the present disclosure, and the configuration of the demand response control system 10 may be changed according to the embodiment. For example, the electronic device 100 may perform an operation of the power amount data providing device 130 by including the function of the power amount data providing device 130. For another example, the power amount data providing device 130 may be configured as a single device integrated with the power control requesting device 140.

Figure 2:
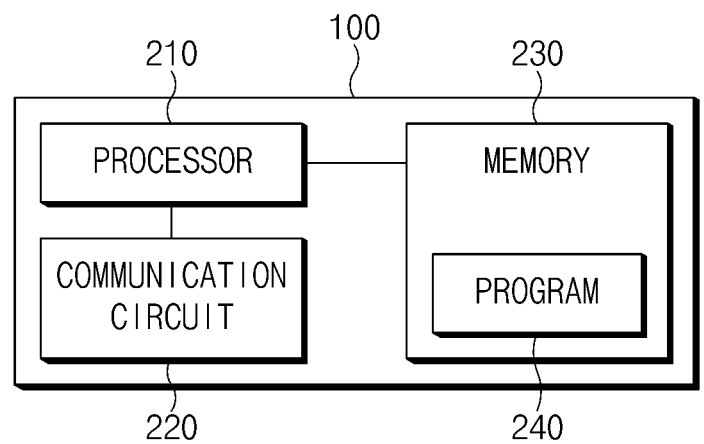
FIG. 2 is a conceptual diagram illustrating a configuration of an electronic device according to an embodiment.

FIG. 2 is a conceptual diagram illustrating a configuration of an electronic device 100 according to an embodiment of the present disclosure. According to the embodiment, the electronic device 100 may include a processor 210, a communication circuit 220, and a memory 230. However, FIG. 2 is for illustrating an embodiment, and the electronic device 100 may be configured to further include other components not illustrated in FIG. 2 or may be configured as a distributed device.

The processor 210 may include one or more of a central processing unit (CPU), an application processor (AP), a graphics processing unit (GPU), an image signal processor (ISP) of a camera, and a communication processor (CP). The processor 210 may be implemented by a system on chip (SoC) or a system in package (SiP). The processor 210 may control at least one other component (e.g., hardware or software component) of the electronic device 100 connected to the processor 210 by driving an operating system or an application program, for example, and may perform various data processing and operations. The processor 210 may load and process commands or data received from at least one of the other components into a volatile memory, and store result data in the non-volatile memory.

The memory 230 may include a volatile memory (not illustrated) or a non-volatile memory (not illustrated). The volatile memory may be composed of, for example, a random access memory (RAM) (e.g., DRAM, SRAM, or SDRAM). The non-volatile memory may be composed of, for example, a programmable read-only memory (PROM), one time PROM (OTPROM), erasable PROM (EPROM), electrically EPROM (EEPROM), mask ROM, flash ROM, flash memory, hard disk drive (HDD, or a solid state drive (SSD). In addition, the non-volatile memory may be configured with an internal memory disposed therein, or a stand-alone external memory that can be connected and used only when necessary, depending on a connection type with the electronic device 100. The external memory may include a flash drive, for example, compact flash (CF), secure digital (SD), Micro-SD, Mini-SD, extreme digital (xD), a multi-media card (MMC), or a memory stick. The external memory may be functionally or physically connected to the electronic device 100 through a wired manner (e.g., cable or universal serial bus (USB)) or wireless manner (e.g., Bluetooth).

The memory 230 may store a command or data related to at least one other software component of the electronic device 100, for example, a program 240. The program 240 may include, for example, a kernel, a library, an application framework, or an application program (interchangeably "application").

Figure 3:
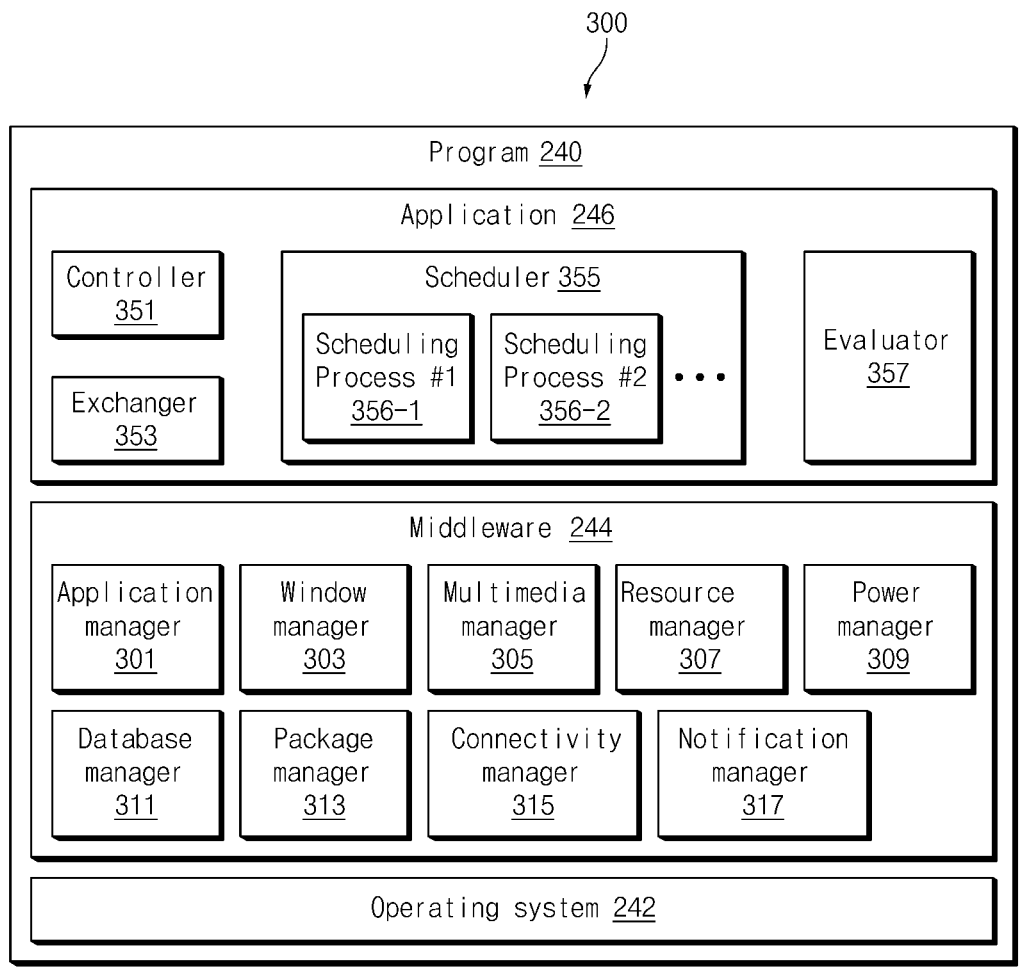
FIG. 3 is a block diagram illustrating a program according to various embodiments.

FIG. 3 is a block diagram 300 illustrating a program 240 according to various embodiments of the present disclosure. According to an embodiment of the present disclosure, the program 240 may include an operating system 242 for controlling one or more resources of the electronic device 100, a middleware 244, or an application 246 executable in the operating system 242. At least some of the programs 240 may be preloaded in the electronic device 100 at the time of manufacture, or may be downloaded from an external electronic device or updated when used by a user.

The operating system 242 may control management (e.g., allocation or withdrawal) of one or more system resources (e.g., process, memory, or power) of the electronic device 100. The operating system 242 may additionally or alternatively include one or more driver programs for driving other hardware devices of the electronic device 100, for example, an input device, a sound output device, a display device, an audio module, a sensor module, an interface, a haptic module, a power management module, a battery, a communication module, or an antenna module.

The middleware 244 may provide various functions to the application 240 so that functions or information provided from one or more resources of the electronic device 100 may be used by the application 240. The middleware 244 may include, for example, an application manager 301, a window manager 303, a multimedia manager 305, a resource manager 307, a power manager 309, a database manager 311, a package manager 313, a connectivity manager 315, or a notification manager 317.

The application manager 301 may manage, for example, the life cycle of the application 246. The window manager 303 may manage, for example, one or more graphic user interface resources used in a screen that the electronic device 100 outputs through the display device. The multimedia manager 305 may, for example, identify one or more formats required for reproduction of media files, and perform encoding or decoding of a corresponding media file using a codec suitable for a selected corresponding format. The resource manager 307 may manage, for example, a source code of the application 246 or a space of the memory 230. The power manager 309 may control, for example, power required for the operation of the electronic device 100 by controlling a power supply.

The database manager 311 may create, search, or change a database to be used by the application 246, for example. The package manager 313 may manage installation or update of an application downloaded in the form of, for example, a package file. The connectivity manager 315 may manage, for example, a communication connection between the electronic device 100 and another external device. The notification manager 317 may provide, for example, a function for notifying the occurrence of a designated event (e.g., power saving request).

The application 246 may include, for example, a device controller 351, an information exchange application 353, a scheduler 355, or an evaluation module 357. The device controller 351 may transmit a control signal for controlling power to a control target device 110 according to, for example, a control level determined by the scheduler 355.

The information exchange application 353 may support information exchange between the electronic device 100 and another device. For example, the information exchange application 353 may include a communication application installed to transfer designated information (e.g., an alarm, message, or control command) to another device or a device management application configured to manage an external device.

The device management application may control, for example, a power supply (e.g., turn-on, turn-off-power saving mode) or a function (e.g., brightness of the display device, resolution, air conditioner's air volume, and cooling temperature) of the control target device 110 communicating with the electronic device 100 or some components thereof. The device management application may additionally or alternatively support installation, deletion, or update of an application operating in the control target device 110.

The scheduler 355 may, for example, execute one or more scheduling processes 356-1 and 356-2 according to the request of the device controller 351 and determine one or more control levels as the execution result. The scheduler 355 may select one of the determined one or more control levels. The scheduler 355 may return the selected control level to the device controller 351.

The evaluation module 357 may, for example, evaluate the power saving amount for the user of the control target device 110 after the power control operation is performed. In addition, the evaluation module 357 may support, for example, information for determining an incentive value to be distributed to each user.

Figure 4:
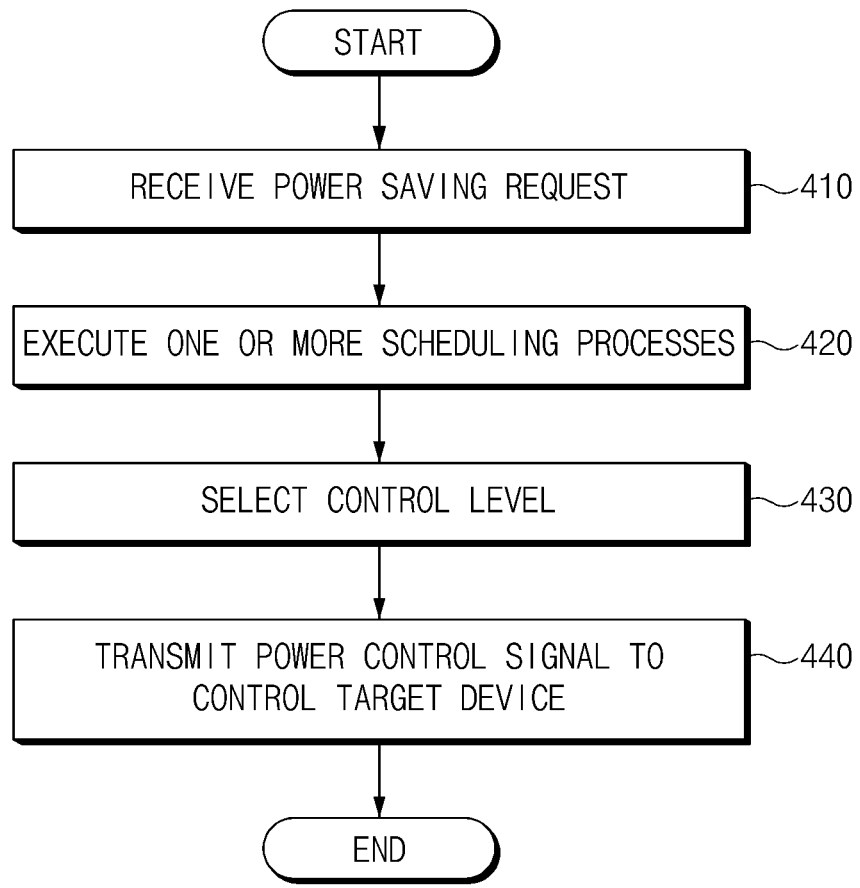
FIG. 4 is a flowchart illustrating a process of controlling a control target device by the electronic device according to an embodiment.

FIG. 4 is a flowchart illustrating a process of controlling the control target device 110 by the electronic device 100 according to an embodiment of the present disclosure.

First, in operation 410, the electronic device 100 may receive a power saving request. Here, the power saving request may be a request that the power amount data providing device 130 transmits a request, which was received from the power control request device 140, to the electronic device 100. The power saving request may include information related to a power control operation for saving power. For example, the power saving request may include information on a period during which the power control operation is to be performed or a power saving amount (e.g., a saving ratio to a reference amount) to be achieved through the power control operation.

The electronic device 100 receiving the power saving request may perform a power control operation. In operation 420, the electronic device 100 may execute one or more scheduling processes for respectively determining a control level. Throughout this specification, the control level may be information indicating a degree to which power usage of the control target device 110 is adjusted. For example, the control level determined by executing the scheduling process may be information indicating a degree to which power usage is controlled, such as 'decreasing power usage by two steps', 'maintaining power usage', or 'increasing power usage by one step'.

After one or more control levels are determined, the electronic device 100 may select one of the one or more control levels in operation 430. According to another embodiment of the present disclosure, the electronic device 100 may determine a final control level in operation 430 according to a predetermined priority for a scheduling process. For example, the control level may be determined in operation 430 in such a way of correcting the control level determined by the first scheduling process 356-1, by using the control level determined by the second scheduling process 356-2.

Thereafter, in operation 440, the electronic device 100 may transmit a power control signal corresponding to the selected control level to the control target device 110. For example, the electronic device 100 may transmit a power control signal to the control target device 110 through a network such as an Internet network. According to an embodiment of the present disclosure, the electronic device 100 may receive a power control result report from the control target device 110 in response to the transmitted power control signal.

Figure 5:
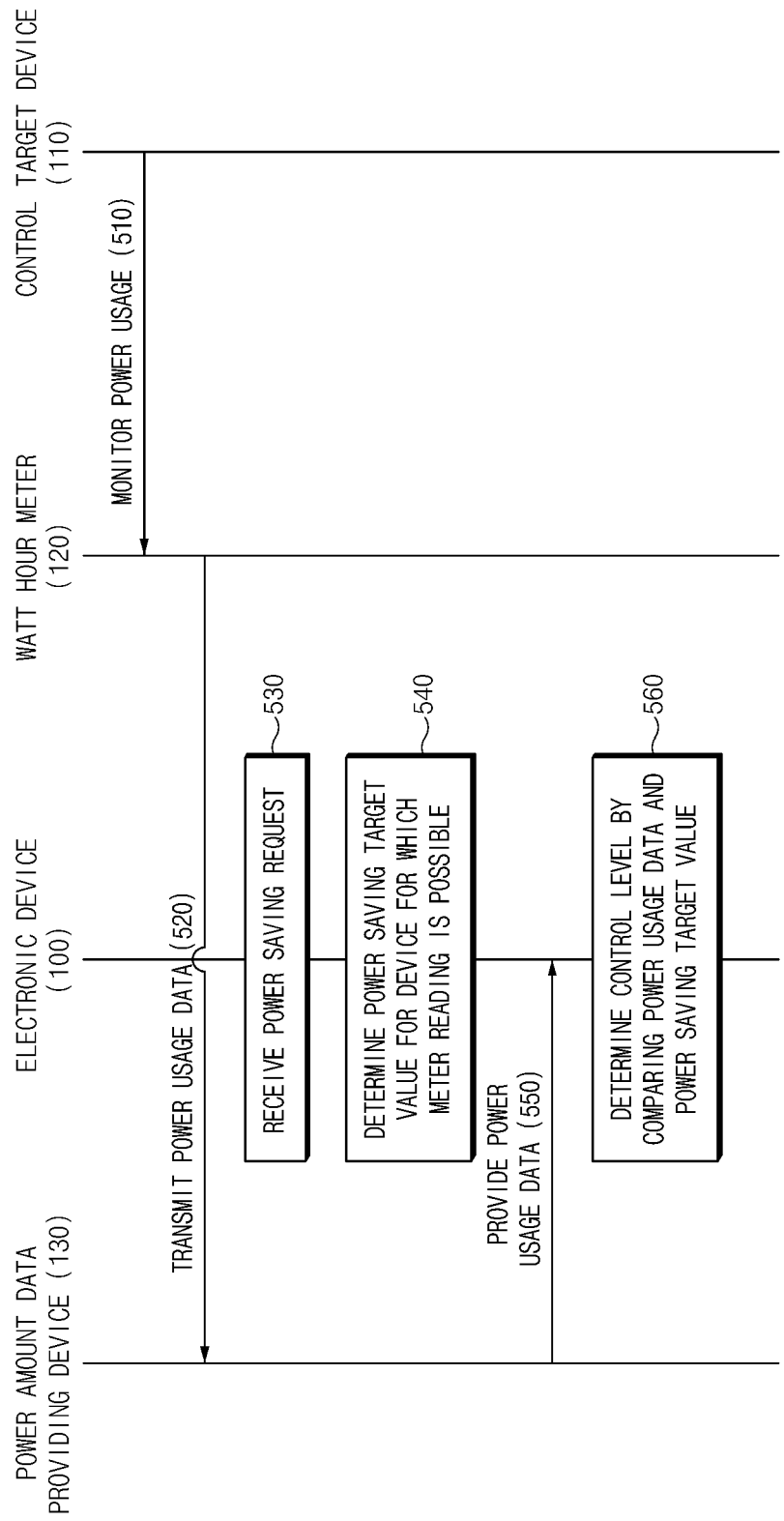
FIG. 5 is a flowchart for illustrating a method of performing a first scheduling process by the electronic device according to an embodiment.

FIG. 5 is a flowchart illustrating a method of performing the first scheduling process 356-1 by the electronic device 100 according to an embodiment of the present disclosure.

Here, the control target device 110 illustrated in FIG. 5 means a device on which the watt hour meter 120 is installed, like the control target devices 110-3, 110-4, and 110-5 included in the first group illustrated in FIG. 1, and for which the power usage can be read by the watt hour meter 120.

First, the watt hour meter 120 may perform operation 510 of constantly or periodically monitoring the power usage of the control target device 110. The watt hour meter 120 may perform operation 520 of transmitting power usage data including information on the monitoring result to the power data providing device 130. Accordingly, the power amount data providing device 130 may acquire power usage data (or first power usage data) of the control target device 110 on which the watt hour meter 120 is installed through the watt hour meter 120.

If the electronic device 100 receives a power saving request in operation 530, the electronic device 100 may acquire a power saving target value (or a first power saving target value) corresponding to the power saving request. Here, the first power saving target value may mean an amount of power that should be saved by all of the control target devices registered in the electronic device 100 and participating in power control according to a demand response. IF the power saving request is received, the electronic device 100 may execute the first scheduling process 356-1 of operations 540 to 560.

In operation 540, the electronic device 100 may determine the power saving target value (or a second power saving target value) for the device (e.g., control target devices 110-3, 110-4, and 110-5 belonging to the first group 111) for which meter reading is possible. Here, the device for which meter reading is possible may mean a device on which the watt hour meter 120 can be installed to acquire power usage data (or first power usage data).

According to an embodiment of the present disclosure, the electronic device 100 may determine a value, which is obtained by multiplying the first power saving target value by a ratio of the number of devices of all control target devices and the number of devices of the first control target device, as the second power saving target value. In other words, the electronic device 100 may determine a value obtained by dividing the value, which is obtained by multiplying the first power saving target value by the amount of resources of devices for which meter reading is possible, by the amount of resources of all devices registered in the electronic device 100 as the second power saving target value. That is, if the first power saving target value is RA, the second power saving target value is RA', the amount of resources of devices for which meter reading is possible is referred to as CB, and the amount of resources of all devices registered in the electronic device is (CB+CX), the second power saving target value may be expressed as Equation 1 below.

$$RA'=RA*CB/(CB+CX) \quad \text{[Equation 1]}$$

According to another embodiment of the present disclosure, the electronic device 100 may determine the second power saving target value by using the number of controllable devices other than the control target devices registered in the electronic device 100 in order to calculate the second power saving target value based on a device that the electronic device 100 can actually control. That is, the electronic device 100 may determine a value, which is obtained by multiplying the first power saving target value by the number of devices that can be controlled by the electronic device 100 among devices for which meter reading is possible and then dividing the multiplication result by the number of all devices that can be controlled by the electronic device 100, as the second power saving target value. In other words, the electronic device 100 may determine a value, which is obtained by multiplying the first power saving target value by the ratio of the number of devices of controllable devices among the first control target devices and the number of devices of controllable devices among all control target devices, as the second power saving target value.

In addition, the electronic device 100 may receive the first power usage data by requesting the power amount data providing device 130 to transmit the first power usage in operation 550.

Since data trusted by the user of the power usage data providing device 130 or the power control requesting device 140 is data acquired through the watt hour meter 120, the electronic device 100 may determine a control level for all control target devices based on the first power usage data.

Accordingly, in operation 560, the electronic device 100 may determine the control level (or a first control level) by comparing the first power usage data and the second power saving target value. Comparing the power usage data with the power saving target value may include a case of comparing the saving target value compared to the accumulated time to be achieved until a comparison time point according to a targeted power saving target value with the power saving amount measured by accumulating up to the comparison time point and a case of comparing the target usage compared to the accumulated time to be achieved until the comparison time point according to the target power usage determined corresponding to the targeted power saving target value with the power usage measured by accumulating up to the comparison time point.

Figure 6:
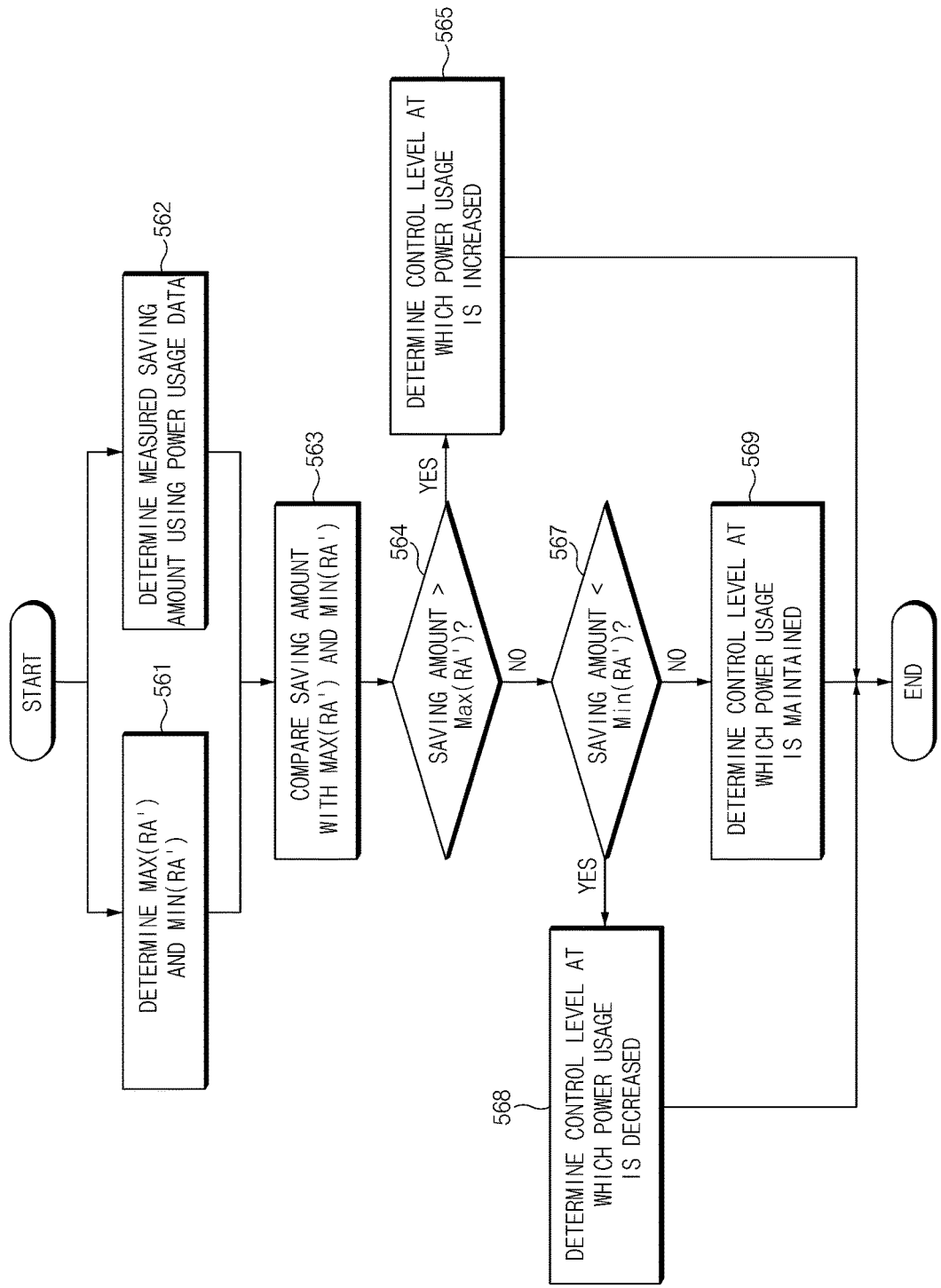
FIG. 6 is a flowchart for illustrating a method of determining a first control level by the electronic device according to an embodiment.

FIG. 6 is a flowchart illustrating a method of determining a first control level by the electronic device 100 according to an embodiment of the present disclosure.

According to the embodiment, in operation 561, the electronic device 100 may determine a first maximum power saving amount Max(RA') and a first minimum power saving amount Min(RA') from a second power saving target value RA'.

In operation 562, the electronic device 100 may determine a measured saving amount (a power saving amount for one or more control target devices belonging to the first group 111) using the first power usage data. In operation 562, the measured saving amount may be obtained by subtracting the accumulated power usage of the first power usage data from customer baseline load (CBL). The customer baseline load may be, for example, a constant representing the power usage expected to be used by one or more control target devices 110 belonging to the first group 111 in normal times (a state in which the power control operation by the electronic device 100 is not performed).

Providers that provide incentives often provide incentives only if the power user achieve power saving equal to or greater than a minimum value compared to their target saving amount. In addition, providers often do not provide more incentives than incentives corresponding to the maximum value even if the power user achieves power saving exceeding the maximum value compared to the target saving amount. Accordingly, for the power user, the control target device 110 is required to achieve the power saving amount equal to or greater than the minimum value, and the need to achieve the power saving amount by exceeding the maximum value is low when the power saving amount reaches the maximum value. According to this, the first maximum power saving amount and the first minimum power saving amount may be determined. For example, the first maximum power saving amount may be a value corresponding to 120% of the second power saving target value, and the first minimum power saving amount may be a value corresponding to 90% of the second power saving target value.

In operation 563, the electronic device 100 may compare the measured saving amount with the first maximum power saving amount and the first minimum power saving amount. In operation 564, if the measured saving amount is greater than the first maximum power saving amount, the electronic device 100 may perform operation 565 of determining a first control level so as to cause the power usage of the control target device 110 to be increased. For example, the first control level, which causes the power usage of the control target device 110 to be increased, may mean releasing a power saving mode of the control target device 110 being operated in the power saving mode and allowing the control target device 110 to operate in a normal mode. The devices targeted for power control according to the control level determined by the electronic device 100 may be all control target devices (one or more control target devices belonging to the first group 111 or the second group 112).

Figure 7A:
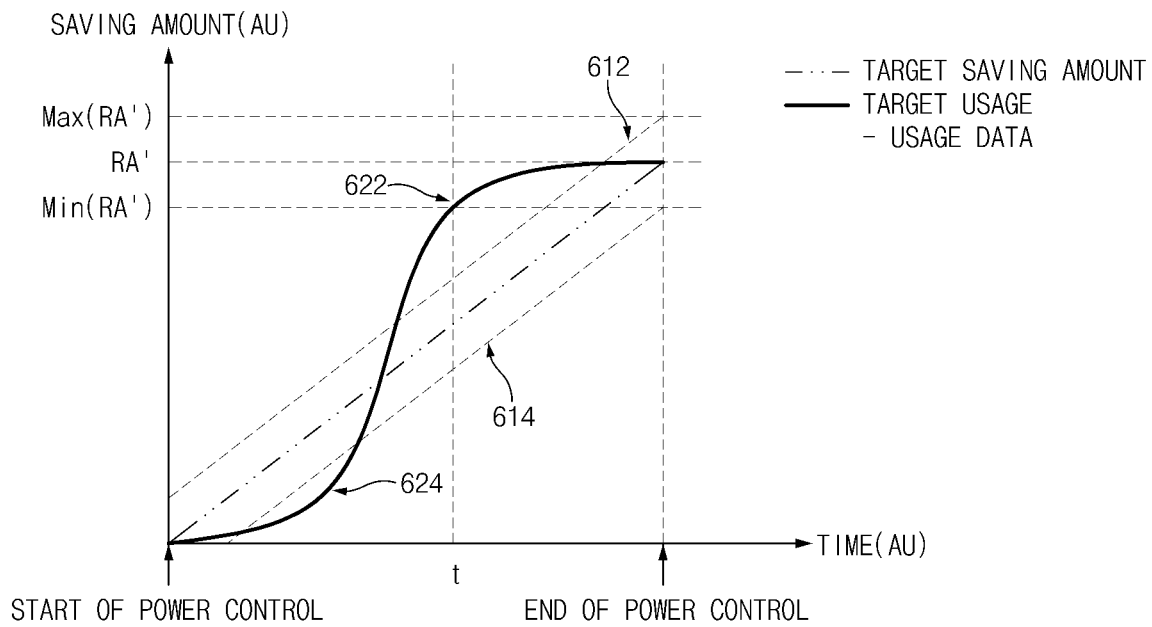
FIG. 7A is a graph for illustrating a criterion for determining a first control level by the electronic device according to various embodiments.

Referring to FIG. 7A, when the measurement time point t of the saving amount is at a point 622 where the accumulated saving amount is higher than a maximum saving amount line 612, power usage is excessively limited, and thus the electronic device 100 may determine a control level that causes power usage to be increased (causes power saving amount to be reduced).

Again, in operation 567 of FIG. 6, if the measured saving amount is less than the first minimum power saving amount, the electronic device 100 may perform operation 568 of determining the first control level that causes the power usage of the control target device 110 to be decreased. For example, if the control target device 110 is an air conditioner, the first control level that causes to be decreased may mean increasing a cooling temperature by allowing the air conditioner to operate in a power saving mode.

Referring to FIG. 7A, when the measurement time point t of the saving amount is at a point 624 where the accumulated saving amount is lower than a minimum saving amount line 614, additional power saving is required, and thus the electronic device 100 may determine a control level that causes the power usage to be reduced (causes power saving amount to be increased).

Again, in operation 567 of FIG. 6, if the measured saving amount is lower than the first maximum power saving amount and higher than the first minimum power saving amount, the electronic device 100 may perform an operation 569 of determining a first control level that causes the power usage of the control target device 110 to be maintained.

Although FIG. 6 illustrates a process of determining the first control level based on the power saving amount obtained from the first power usage data, according to another embodiment of the present disclosure, the electronic device may determine the first control level based on the power usage included in the first power usage data.

If the first control level is determined based on the power usage, the electronic device 100 may determine the maximum power usage and the minimum power usage, which are standards for achieving the target power usage, in operation 561 of FIG. 6. The target power usage for the first control target device may be a value obtained by subtracting RA' from the CBL. The maximum power usage may be a value obtained by subtracting the first minimum power saving amount Min(RA') from the CBL. The minimum power usage may be a value obtained by subtracting the first maximum power saving amount Max(RA') from the CBL.

In addition, if the first control level is determined based on power usage, operation 562 is omitted, and operations 563 to 567 may be replaced with operations of comparing the power usage included in the first power usage data with the maximum power usage and the minimum power usage.

Figure 7B:
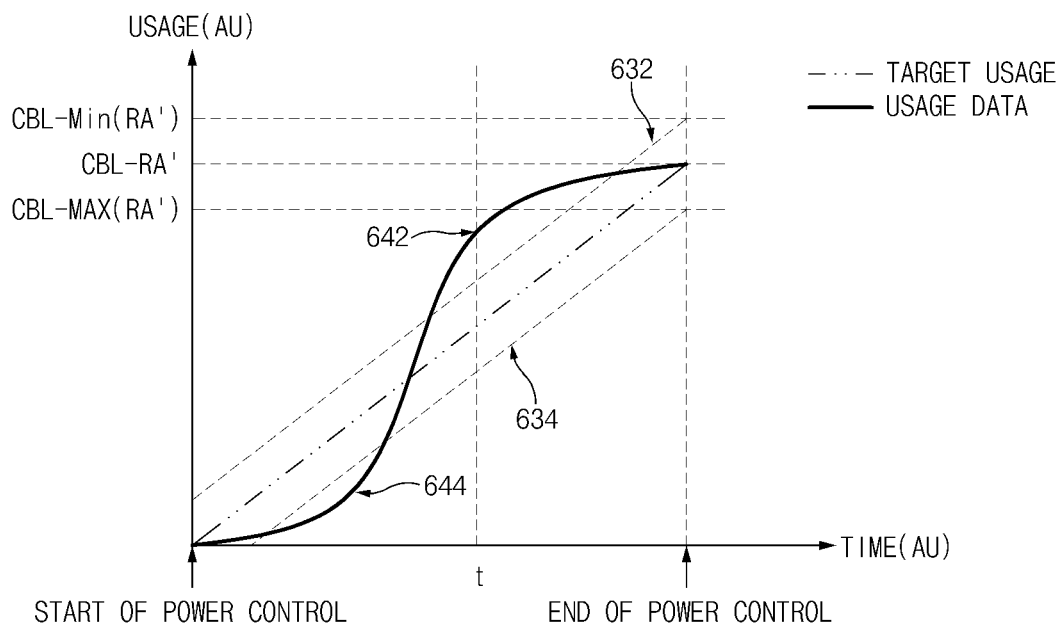
FIG. 7B is another graph for illustrating the criterion for determining the first control level by the electronic device according to various embodiments.

Referring to FIG. 7B, when the measurement time t of the saving amount is at a point 642 where the measured power usage is higher than a maximum power usage line 632, the electronic device 100 may determine a first control level that causes power usage to be reduced. To the contrary, when the measurement time t of the saving amount is at a point 644 where the measured power usage is lower than a maximum power usage line 634, the electronic device 100 may determine a first control level that enables the control target devices to increase power usage.

In addition, according to another embodiment of the present disclosure, if a period for performing a power control operation (or a power saving control period) is determined according to a power control request, the electronic device 100 may divide the power saving control period into sections within the power saving control period and set different criteria for determining the power control level for these sections. For example, referring to FIG. 8, within a first section 651, the electronic device 100 may determine a control level by comparing a value obtained by multiplying a weight value by a reference value determined by a power saving target value that increases over time. Here, as the reference values determined by the power saving target value, values that increase from 0 at the starting time point of power control and reach the target saving amount at the ending time point of power control may be reference values for the respective points in time. In addition, as illustrated in FIG. 8, within a second section 652, the control level may be determined based on a reference value that increases with an increase amount lower than that of the first section 651.

Figure 8:
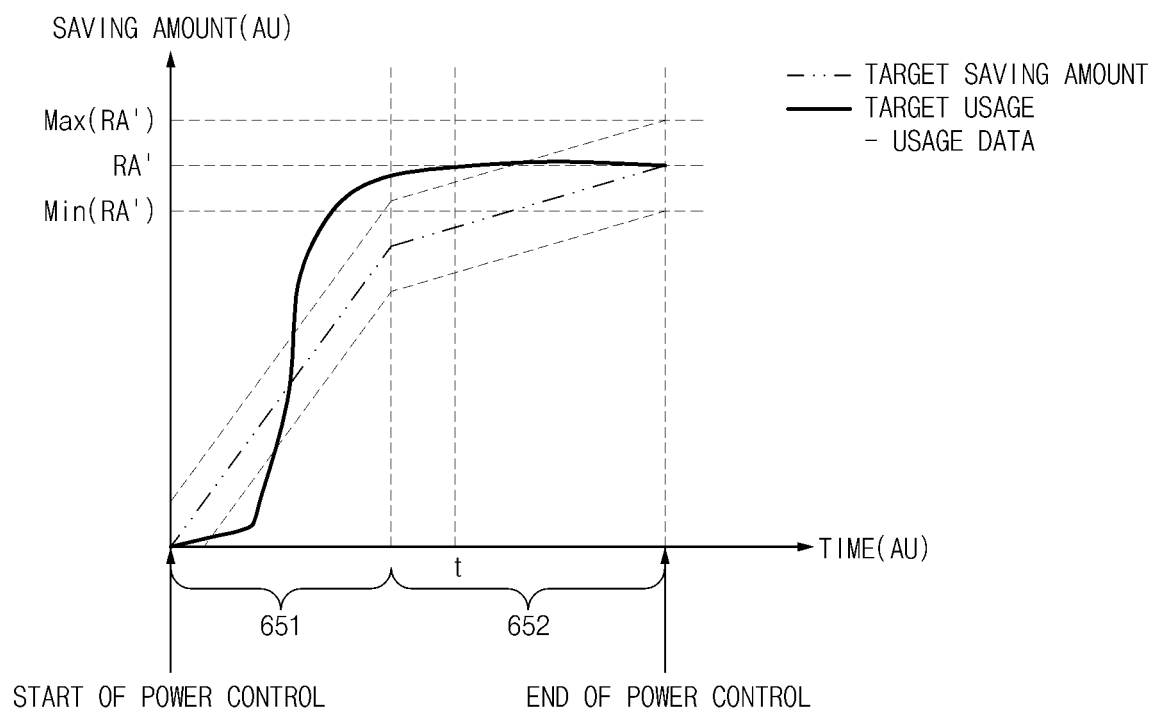
FIG. 8 is a graph for illustrating the criterion for determining the first control level by the electronic device according to another embodiment.

IF the control level is determined in the manner as illustrated in FIG. 8, the electronic device 100 may secure a power saving amount through a high level of power saving control at the beginning of the power saving control period. Accordingly, it is possible to reduce the possibility that the target saving amount cannot be achieved due to a variable at the time point when the power saving control period ends.

Figure 9:
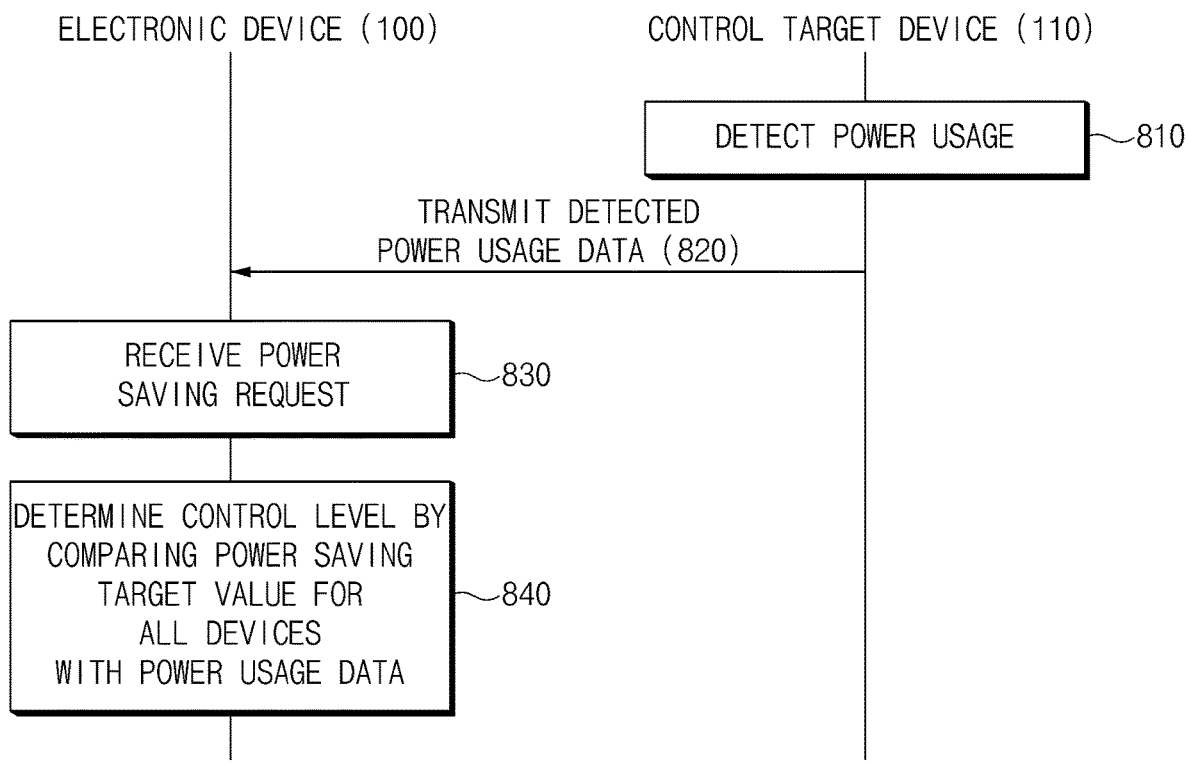
FIG. 9 is a flowchart for illustrating a method of performing a second scheduling process by the electronic device according to an embodiment.

FIG. 9 is a flowchart for illustrating a method of performing the second scheduling process 356-2 by the electronic device 100 according to an embodiment of the present disclosure.

According to the embodiment, the control target device 110 may perform an operation 810 of detecting power usage separately from the watt hour meter 120. For example, in operation 810, the used power may be measured using a power measurement circuit provided in the control target device 110. As another example, the amount of power used by the control target device 110 may be measured using a peripheral device (e.g., an IoT power measurement plug) connected to the control target device 110. According to an embodiment of the present disclosure, the power usage measured in operation 810 may be power usage for one or more control target devices (e.g., 110-1, 110-2, 110-3, 110-4, and 110-5 in FIG. 1) belonging to the first group 111 and the second group 112.

In addition, the electronic device 100 may perform operation 820 of transmitting power usage data (or second power usage data) including information on power usage used by one or more control target devices 110 from one or more control target devices 110.

In operation 830, if the power saving request is received, the electronic device 830 may perform an operation 840 of determining a control level by comparing the power saving target value for all devices (e.g., one or more control target devices (e.g., 110-1, 110-2, 110-3, 110-4, and 110-5 in FIG. 1) belonging to the first group 111 and the second group 112) with the received second power usage data. The devices targeted for power control according to the control level determined by the electronic device 100 may be all control target devices (one or more control target devices belonging to the first group 111 or the second group 112).

However, the order of operations illustrated in the drawings is for convenience of description, and the order of some operations may be changed according to embodiments. For example, in FIG. 9, after receiving the power saving request in operation 830, operations 810 and 820 may be performed.

Figure 10:
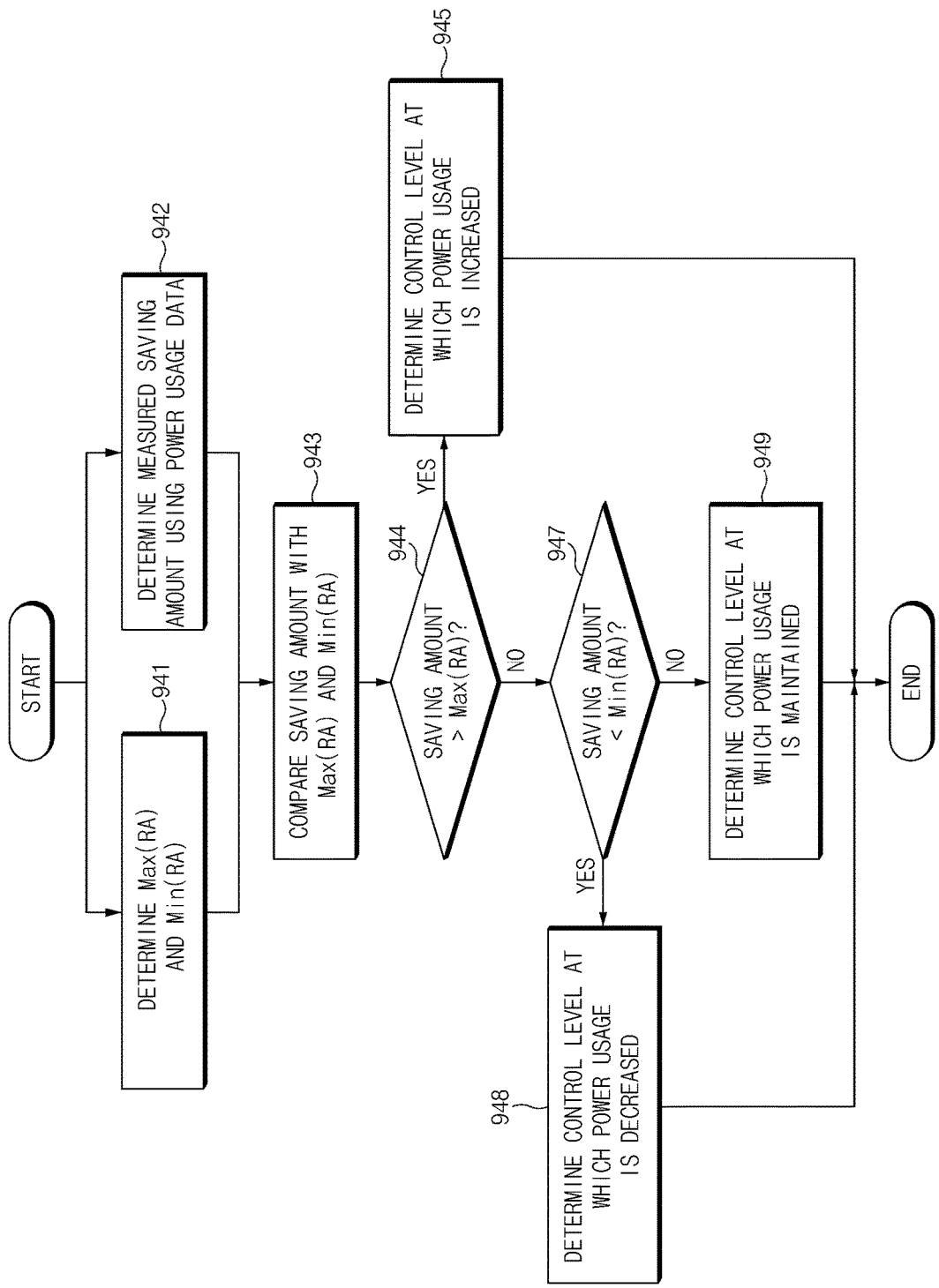
FIG. 10 is a flowchart for illustrating a method of determining a second control level by an electronic device according to an embodiment.

FIG. 10 is a flowchart for illustrating a method of determining a second control level by the electronic device 100 according to an embodiment of the present disclosure.

If a power saving request is received, the electronic device 100 may perform operation 941 of determining a second maximum power saving amount Max(RA) and a second minimum power saving amount Min(RA) from the first power saving target value. For example, the second maximum power saving amount may be a value corresponding to 120% of the first power saving target value, and the second minimum power saving amount may be a value corresponding to 90% of the first power saving target value.

In addition, the electronic device 100 may perform operation 942 of determining the measured saving amount (power saving amount for one or more all control target devices) using the second power usage data acquired from the control target device 110. For example, the electronic device 100 may determine a value, which is obtained by subtracting the power usage included in the second power usage data from the reference usage for one or more control target devices (e.g., 110-1, 110-2, 110-3, 110-4, and 110-5 in FIG. 1) targeted for power control, as the measured saving amount. For example, the reference usage for one or more control target devices (e.g., 110-1, 110-2, 110-3, 110-4, and 110-5 in FIG. 1) targeted for power control may be a constant representing the power usage used by all control target devices in normal times (one or more control target devices belonging to the first group 111 or the second group 112).

Thereafter, in operation 943, the electronic device 100 may compare the measured saving amount with the second maximum power saving amount Max(RA) and the second minimum power saving amount Min(RA). In operation 944, if the measured saving amount is greater than the first maximum power saving amount, the electronic device 100 may perform operation 945 of determining a second control level that causes the power usage of the control target device 110 to be increased.

Figure 11:
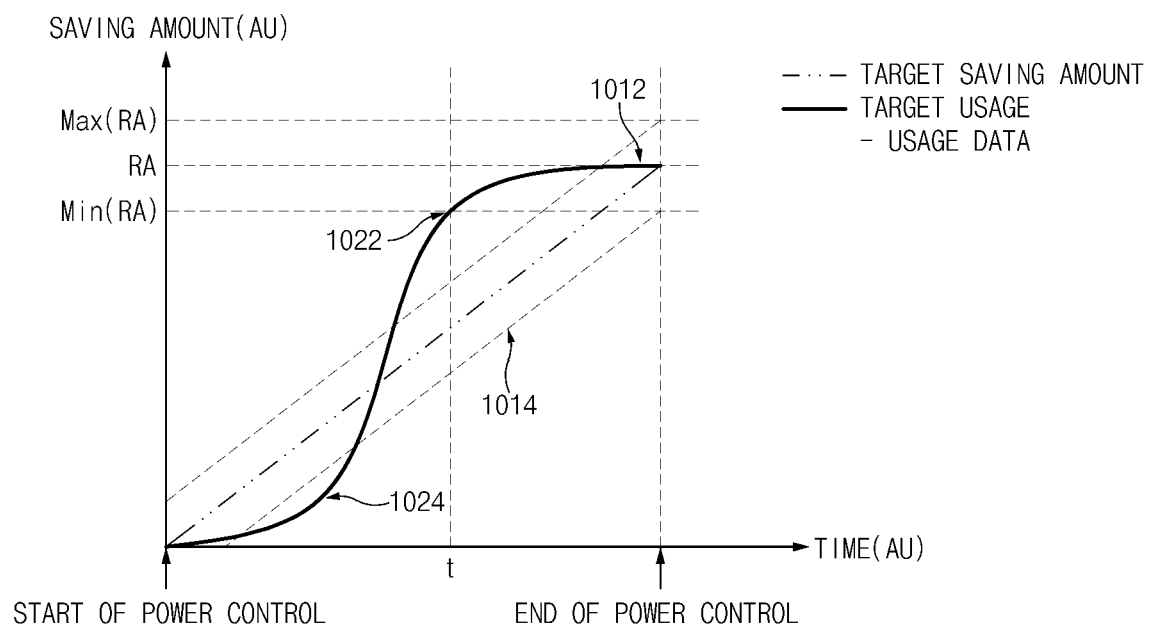
FIG. 11 is another graph for illustrating the criterion for determining the second control level by the electronic device according to the embodiment.

Referring to FIG. 11, when the measurement time point t of the saving amount is at a point 1022 where the accumulated saving amount is higher than a maximum saving amount line 1012, power usage is excessively limited, and thus the electronic device 100 may determine a control level that causes the power usage to be increased (causes the power usage to be reduced).

Again, in operation 947 of FIG. 10, if the measured saving amount is less than the second minimum power saving amount, the electronic device 100 may perform operation 948 of determining a second control level that causes the power usage of the control target device to be decreased.

Referring to FIG. 11, when the measurement point t of the saving amount is at a point 1024 where the accumulated saving amount is lower than the minimum saving amount line 1014, additional power saving is required, and thus the electronic device 100 may determine a control level that causes the power usage to be reduced (causes the power usage to be increased).

Again in operation 947 of FIG. 10, if the measured saving amount is lower than the second maximum power saving amount and higher than the second minimum power saving amount, the electronic device 100 may perform an operation 949 of determining a second control level that causes the power usage of the control target device 110 to be maintained.

According to another embodiment of the present disclosure, similar to that illustrated in FIG. 7B, the electronic device 100 may determine the second control level based on power usage instead of the process illustrated in FIG. 10.

If a plurality of control levels including the first control level and the second control level are determined by executing the first scheduling process and the second scheduling process, the electronic device 100 may select a control level corresponding to a control signal to be transmitted to the control target device 110 according to a rule for selecting the control level. For example, since the user of the power data providing device 130 or the power control requesting device 140 trusts the power usage acquired through the watt hour meter 120, the control level may be selected by giving priority to the first control level, which is a control level determined based on the power usage obtained through the watt hour meter 120. However, since the first scheduling process is required to receive a response to information on power usage by requesting the power usage data providing device 130 to send the information, a delay occurs may occur until power control is performed and then the control level is determined again by receiving feedback on the power control. For example, when the watt hour meter 120 transmits energy usage to the power amount data providing device 130 every 5 minutes, a delay of 5 minutes may occur in the electronic device 100 until the power control operation is performed and then the feedback is received. Therefore, if the first control level, that causes the power usage to be changed, by executing the first scheduling process is not determined, the electronic device 100 may transmit the control signal to the control target device 110 based on the second control level determined through the second scheduling process.

Figure 12:
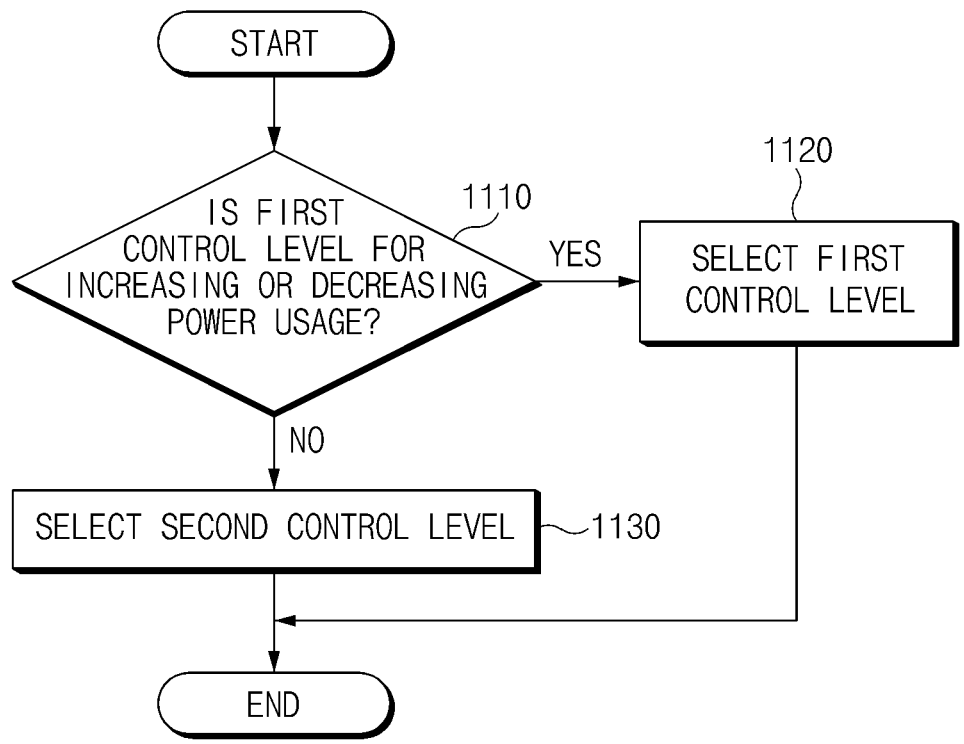
FIG. 12 is a graph for illustrating a criterion for selecting one of a plurality of control levels by an electronic device according to an embodiment.

FIG. 12 is a graph for illustrating a criterion for the electronic device 100 to select one of a plurality of control levels according to an embodiment of the present disclosure.

IF the first control level is determined by executing a plurality of scheduling processes to, the electronic device 100 may perform an operation 1110 of determining whether or not the first control level is for causing the power usage of the control target device 110 to be increased or decreased. Thereafter, if the first control level is for causing the power usage of the control target device 110 to be increased or decreased, the electronic device 100 may perform an operation 1120 of selecting the first control level and transmitting the control signal corresponding to the first control level to the control target device 110.

In operation 1110, when the first control level that causes the power usage to be increased or decreased is not determined and the second control level determined as a result of executing the second scheduling process is for causing the power usage of the control target device 110 to be increased or decreased, the electronic device 100 may select the second control level and perform an operation 1130 of transmitting the control signal corresponding to the second control level to the control target device 110.

Figure 13:
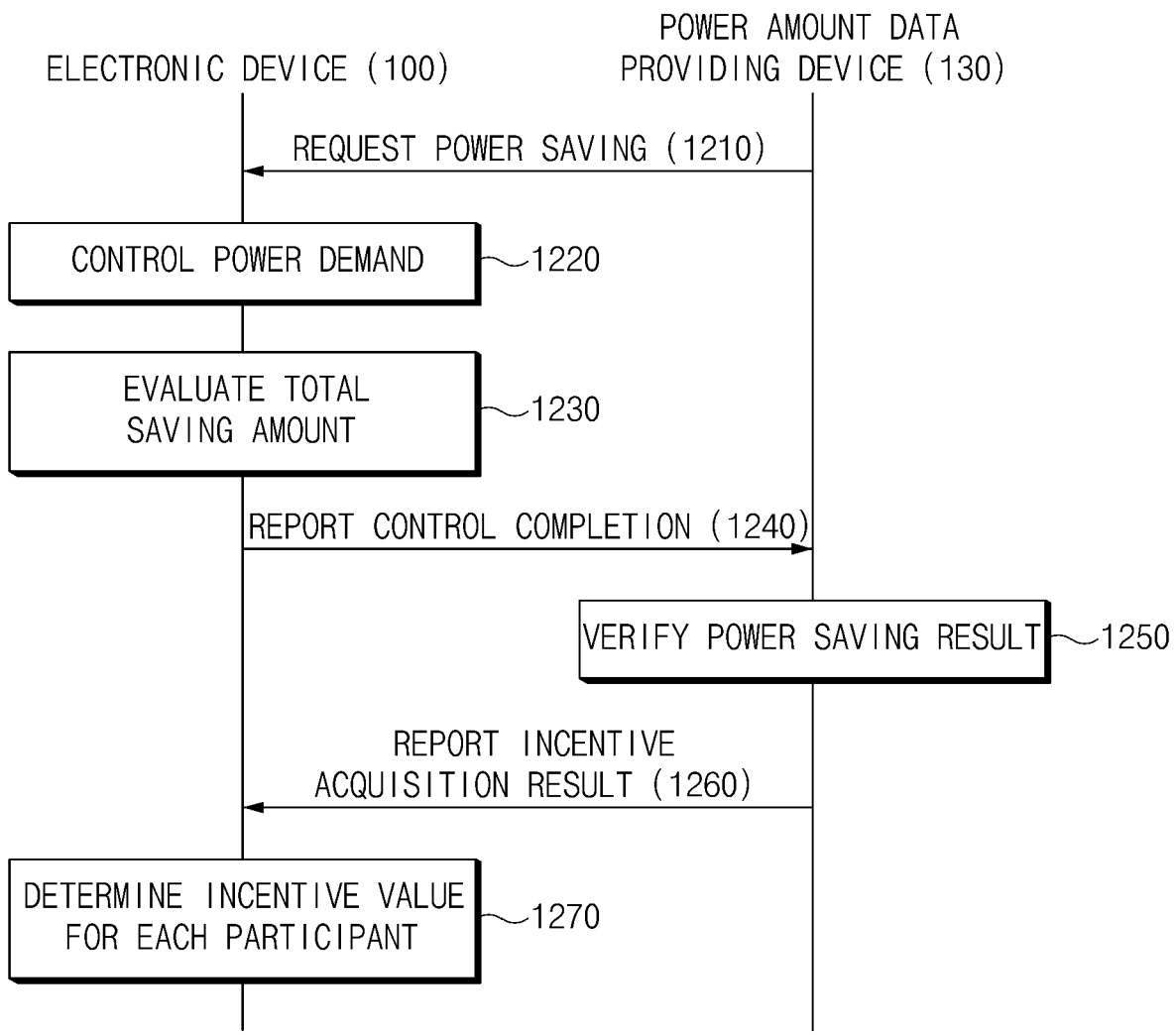
FIG. 13 is a graph for illustrating a process of evaluating a saving amount and distributing incentive values by an electronic device according to an embodiment.

FIG. 13 is a graph for illustrating a process in which the electronic device 100 evaluates a saving amount and distributes incentive values according to an embodiment of the present disclosure.

The electronic device 100 may perform an operation 1210 of receiving a power saving request from the power amount data providing device 130. The electronic device 100 receiving the power saving request from the power data providing device 130 may perform a power demand control operation 1220 (e.g., operations 420 to 440 of FIG. 4) corresponding to the power saving request.

After completing the power demand control operation 1220, the electronic device 100 may perform an operation 1230 of evaluating the total saving amount for one or more control target devices 110. The power usage data providing device 130 may collect power usage data (first power consumption data) including information on power used by one or more control target devices 110-3, 110-4, and 110-5 belonging to the first group 111 from the watt hour meter 120. Accordingly, the power data providing device 130 may calculate a power saving amount value (first power saving amount value) achieved by one or more control target devices 110-3, 110-4, and 110-5 belonging to the first group 111 from the first power usage data. That is, the power amount data providing device 130 may obtain a value obtained by subtracting the measured power usage from the reference amount of use of one or more control target devices 110-3, 110-4, and 110-5 belonging to the first group 111 as the first power saving amount value. However, the power data providing device 130 does not have data for calculating the power saving amount value (second power saving amount value) of one or more control target devices 110-1 and 110-2 belonging to the second group 112.

To the contrary, the electronic device 100 may obtain data on all of the one or more control target devices 110-1, 110-2, 110-3, 110-4, and 110-5. Here, the data may include power usage data (second power usage data) including information on power usage used by one or more control target devices 110-1, 110-2, 110-3, 110-4, and 110-5. Accordingly, the electronic device 100 may obtain information on the power saving amount of all of the one or more control target devices 110-1, 110-2, 110-3, 110-4, and 110-5 from the second power usage data. However, there is a problem in that it is difficult for the user of the power amount data providing device 130 or the power saving requesting device 140 to trust the power saving amount value calculated by the electronic device 100 alone.

Accordingly, the electronic device 100 is required to provide a total saving amount value based on the first power saving amount value. In operation 1230, the electronic device 100 may determine the power saving amount (hereinafter, CXCM) achieved by one or more control target devices 110-1 and 110-2 belonging to the second group 112 from the power usage data (third power usage data) including information on the power amount used by one or more control target devices 110-1 and 110-2 belonging to the second group 112 among the second power usage data. In addition, the electronic device 100 may determine the power saving amount (hereinafter, CBCM) achieved by all of the one or more control target devices 110-1, 110-2, 110-3, 110-4, and 110-5 from the second power usage data.

Thereafter, the electronic device 100 may determine a value, which is obtained by multiplying the first power saving amount by CXCM and then dividing the multiplication result by CBCM, as the second power saving amount value. In addition, the electronic device 100 may determine a sum of the first power saving amount value and the second power saving amount value as the total saving amount value. Here, the first power saving value may be provided from the power data providing device 130. Alternatively, the electronic device 100 may calculate the first power saving amount value from the first power usage data provided from the power amount data providing device 130.

Thereafter, the electronic device 100 may perform an operation 1240 of transmitting a control completion report including information on the result of performing the power demand control operation to the power data providing device 130. Here, the control completion report may include information on the total saving amount value calculated by the electronic device 100.

The power usage data providing device 130 may perform an operation 1250 of verifying a power saving result corresponding to the control completion report based on the received control completion report. According to an embodiment of the present disclosure, if verification of the power saving result is completed, the power usage data providing device 130 may report information on the power saving result to the power control requesting device 140.

Thereafter, an incentive amount may be determined by the incentive provider who has received information on the power saving result through the power data providing device 130 or the power control requesting device 140. The power amount data providing device 130 may perform an operation 1260 of transmitting an incentive acquisition result report including information on the incentive amount to the electronic device 100.

The electronic device 100 that has received the incentive acquisition result report may perform an operation 1270 of determining the incentive value for each participant participating in power demand control. According to an embodiment of the present disclosure, the electronic device 100 may distribute incentives using power usage data provided from each control target device. For example, it is assumed that users participating in the power demand control through one or more devices included in the first group 111 are A and B, users participating in the power demand control through one or more devices included in the second group 112 are C, D, and E, and the power saving amount performed by each user is evaluated by the electronic device 100 as E(A), E(B), E(C), E(D), and E(E). In this case, the control device 100 may determine the incentive amount allocated to A as a value obtained by multiplying the total incentive amount included in the incentive acquisition result report by E(A) and then dividing the multiplication result by E(A)+E(B)+(C)+E(D)+E(E).

It should be understood various embodiments of this document and terms used therein are not intended to limit the technology described in this document to a specific embodiment of the present disclosure, and various modifications, equivalents, and/or substitutes of the corresponding embodiment are included in the scope of the present disclosure. In connection with the description of the drawings, similar reference numerals may be used for similar constituent elements. Singular expressions may include plural expressions unless the context clearly indicates otherwise. In this document, expressions such as "A or B", "at least one of A and/or B", "A, B or C" or "at least one of A, B and/or C" may include all possible combinations of items listed together. Expressions such as "first," "second," "firstly," or "secondly," may modify the corresponding constituent elements regardless of their order or importance, and are used to distinguish one constituent element from another constituent element, but do not limit the corresponding constituent elements. When a certain (e.g., first) constituent element is referred to as being "(functionally or communicatively) coupled" or "connected" to another (e.g., second) constituent element, the certain constituent element may be directly connected to the other constituent element or may be connected thereto through another constituent element (e.g., a third component).

In this document, "adapted to or configured to" may be used interchangeably with "suitable for ~," "having the ability to ~," "modified to ~," "made to ~," "able to ~," or "designed to ~" in hardware or software, for example, depending on the situation. In some situations, the expression "a device configured to ~" may mean that the device "can ~" along with other devices or parts. For example, the phrase "a processor adapted to (or configured to) perform A, B, and C" may mean a dedicated processor (e.g., embedded processor) for performing corresponding operations, or a general-purpose processor (e.g., CPU or AP) capable of performing corresponding operations by executing one or more programs stored in a memory device (e.g., memory 230).

The term "module" used in this document includes a unit composed of hardware, software, or firmware, and may be used interchangeably with terms such as logic, logic blocks, parts, or circuits. The "module" may be an integrally configured part or a minimum unit that performs one or more functions, or a part thereof. The "module" may be implemented mechanically or electronically, and may include, for example, application-specific integrated circuit (ASIC) chips, field-programmable gate arrays (FPGAs), or programmable logic devices, known or to be developed, that perform certain operations.

At least a part of a device (e.g., modules or their functions) or method (e.g., operations) according to various embodiments may be implemented by instructions stored in a computer-readable storage medium (e.g., memory 230) in the form of a program module. When the instructions are executed by a processor (e.g., processor 210), the processor may perform a function corresponding to the instructions. The computer-readable recording medium may include a hard disk, a floppy disk, a magnetic medium (e.g. magnetic tape), an optical recording medium (e.g. CD-ROM, DVD, magnetic-optical media (e.g. floptical disk)), an internal memory, and so on. The instructions may include code generated by a compiler or code that can be executed by an interpreter.

Constituent elements (e.g., modules or program modules) according to various embodiments of the present disclosure may be respectively composed of singular or plural entities, and some sub-elements among the aforementioned sub-elements may be omitted, or other sub-elements may be further included in the constituent element. Alternatively or additionally, some constituent elements (e.g., a module or a program module) may be integrated into a single entity to perform functions performed by each corresponding constituent element before the integration identically or similarly. Operations performed by modules, program modules, or other constituent elements according to various embodiments of the present disclosure may be sequentially, concurrently, repetitively or heuristically executed, or at least some operations may be executed in a different order, omitted, or other operations may be added thereto.

The invention claimed is:

1. An electronic device comprising:
   a communication circuit configured to receive data related to one or more control target devices from the one or more control target devices or transmit a control signal to the one or more control target devices;
   one or more processors configured to perform communication by being connected thereto; and
   a memory electrically connected to the one or more processors and configured to store one or more instructions executable by the one or more processors,
   wherein the one or more instructions that, when executed, cause the one or more processors
   to determine at least one control level by executing at least one scheduling processes and to transmit a power control signal corresponding to a control level selected from among the determined at least one control level to the one or more control target devices through the communication circuit, and
   wherein the at least one scheduling processes include a first scheduling process of receiving first power usage data from an external power amount data providing device through the communication circuit and determining a first control level of the at least one control level, based on the received first power usage data,
   wherein data for the first power usage data is data on one or more first control target devices belonging to a first group among the one or more control target devices, and the first scheduling process determines a second power saving target value for the one or more first control target devices from a first power saving target value for the one or more target devices and determines the first control level by comparing the first power usage data and the second power saving target value, and
   wherein the first scheduling process determines a value, which is obtained by multiplying the first power saving target value by a ratio of the number of devices of the one or more one control target devices and the number of devices of the first control target device or a ratio of the number of devices controllable by the electronic device among the first control target devices and the number of devices controllable by the electronic device among the one or more control target devices, as the second power saving target value.

2. The electronic device of claim 1, wherein
   the one or more control target devices include one or more first control target devices belonging to the first group and one or more second control target devices belonging to a second group, and
   the first control target device is a device for which the power amount data providing device is able to collect data on power usage, and the second control target device is a device for which the power amount data providing device is not able to collect data on power usage.

3. The electronic device of claim 1, wherein
   the at least one control level includes the first control level and a second control level,
   the data includes second power usage data including information on power usage used by the one or more control target devices, and
   the at least one scheduling processes further include a second scheduling process for determining the second control level based on the second power usage data.

4. The electronic device of claim 3, wherein
   the second scheduling process determines the second control level by comparing a first power saving target value for the one or more control target devices with the second power usage data.

5. The electronic device of claim 3, wherein
   the one or more instructions that, when executed, cause the one or more processors to
   transmit a power control signal corresponding to the first control level to the one or more control target devices when the first control level is set to cause the power usage of the one or more control target devices to be increased or decreased, and
   transmit a power control signal corresponding to the second control level to the one or more control target devices when the first control level is set to cause the power usage of the one or more control target devices to be maintained.

6. The electronic device of claim 1, wherein
   data on the first power usage data is received from a power amount data providing device, and is data on one or more first control target devices belonging to a first group among the one or more control target devices, the data includes third power usage data provided to the electronic device from one or more second control target devices belonging to a second group among the one or more control target devices, and the one or more instructions that, when executed, cause the one or more processors to after the power control signal is transmitted to the one or more control target devices, obtain a first power saving amount value for the one or more first control target devices from among the one or more control target devices using information received from the power amount data providing device, determine a second power saving amount value for the one or more second control target devices based on the first power saving amount value, the first power usage data, and the third power usage data, and generate a total saving amount value based on the first power saving amount value and the second power saving amount value.

7. The electronic device of claim 6, wherein the one or more instructions that, when executed, cause the one or more processors to determine a third power saving amount value based on the first power usage data, determine a fourth power saving amount value based on the third power usage data, and determine a value obtained by dividing a value, which is obtained by multiplying the first power saving amount value by the third power saving amount value, by the fourth power saving amount value as the second power saving amount value.

8. The electronic device of claim 1, wherein the data includes second power usage data including information on power usage used by the one or more control target devices, and the one or more instructions that, when executed, cause the one or more processors to after the power control signal is transmitted to the one or more control target devices, determine an incentive value for each participant distributed to at least one user based on the second power usage data.

9. An electronic device comprising:

a communication circuit configured to receive data related to one or more control target devices from the one or more control target devices or transmit a control signal to the one or more control target devices;

one or more processors configured to perform communication by being connected; and a memory electrically connected to the one or more processors and configured to store one or more instructions executable by the one or more processors, wherein the one or more instructions that, when executed, cause the one or more processors upon receipt of a power saving request including information on a power saving control period to determine at least one control level by executing at least one scheduling processes and to transmit a power control signal corresponding to a control level selected from among the determined at least one control level to the one or more control target devices through the communication circuit, and wherein the at least one scheduling processes include a first scheduling process of receiving first power usage data from an external power amount data providing device through the communication circuit and determining a first control level of the at least one control level, based on the received first power usage data, wherein data for the first power usage data is data on one or more first control target devices belonging to a first group among the one or more control target devices, and wherein the first scheduling process determines a second power saving target value for the one or more first control target devices from a first power saving target value for the one or more target devices, determines the first control level by comparing the first power usage data with a value obtained by multiplying a weight value by a reference value determined according to the second power saving target value within a first section of the power saving control period, and determines the first control level by comparing the first power usage data with a reference value, which increases with an increase amount lower than that of the first section, within a second section of the power saving control period.

10. A method for controlling power usage of one or more control target devices by an electronic device, the method comprising:

determining at least one control level by executing at least one scheduling process;

selecting one control level from among the at least one control level; and transmitting a power control signal corresponding to the selected control level to the one or more control target devices, wherein the determining the control level includes a performing a first scheduling process of receiving first power usage data from an external power amount data providing device and determining a first control level of the at least one control level, based on the first power usage data, wherein data for the first power usage data is data on one or more first control target devices belonging to a first group among the one or more control target devices, and the performing the first scheduling process includes determining a second power saving target value for the one or more first control target devices from a first power saving target value for the one or more target devices, and determining the first control level by comparing the first power usage data and the second power saving target value; and the determining a second power saving target value includes an operation of determining a value, which is obtained by multiplying the first power saving target value by a ratio of the number of devices of the one or more one control target devices and the number of devices of the first control target device or a ratio of the number of devices controllable by the electronic device among the one or more control target devices, as the second power saving target value.

11. The method of claim 10, wherein data for the first power usage data is data on one or more first control target devices belonging to a first group among the one or more control target devices, and the performing the first scheduling process includes determining a second power saving target value for the one or more first control target devices from a first power saving target value for the one or more target devices and determining the first control level by comparing the first power usage data and the second power saving target value.

12. A method for controlling power usage of one or more control target devices by an electronic device, the method comprising:
- determining at least one control level by executing at least one scheduling process when a power saving request including information on a power saving control period is received;
- selecting one control level from among the at least one control level; and
- transmitting a power control signal corresponding to the selected control level to the one or more control target devices, wherein
- the determining the control level includes a performing a first scheduling process of receiving first power usage data from an external power amount data providing device and determining a first control level of the at least one control level, based on the first power usage data,
- wherein data for the first power usage data is data on one or more first control target devices belonging to a first group among the one or more control target devices, and
- wherein the performing the first scheduling process includes determining a second power saving target value for the one or more first control target devices from a first power saving target value for the one or more target devices, determining the first control level by comparing a value obtained by multiplying the second power saving target value by a weight value with the first power usage data within a first section of the power saving control period, and determining the first control level by comparing the first power usage data with the second power saving target value within a second section of the power saving control period.

* * * * *